United States Patent
Cai et al.

(10) Patent No.: US 7,056,565 B1
(45) Date of Patent: Jun. 6, 2006

(54) CONTAINER HAVING OXYGEN-SCAVENGING CORE LAYER

(75) Inventors: Gangfeng Cai, Danville, CA (US); Ta Yen Ching, Novato, CA (US); Hu Yang, San Ramon, CA (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 17 days.

(21) Appl. No.: 09/664,993

(22) Filed: Sep. 18, 2000

Related U.S. Application Data

(63) Continuation-in-part of application No. 09/172,316, filed on Jul. 31, 1998.

(51) Int. Cl.
  *B32B 3/10* (2006.01)

(52) U.S. Cl. ...................... 428/36.7; 428/483
(58) Field of Classification Search ............... 428/36.7, 428/483, 35.7, 35.4, 35.2, 36.6; 525/330.3, 525/330.6, 370, 371, 372, 384
See application file for complete search history.

(56) References Cited

U.S. PATENT DOCUMENTS

| | | | | |
|---|---|---|---|---|
| 3,497,571 A | | 2/1970 | Tellier et al. ............... 260/844 |
| 3,536,687 A | | 10/1970 | Nordstrom ................. 260/89.5 |
| 3,632,684 A | | 1/1972 | Tellier et al. ............... 260/881 |
| 3,873,644 A | | 3/1975 | Pampus et al. ............. 260/879 |
| 4,415,710 A | | 11/1983 | Barnabeo et al. ........... 525/370 |
| 4,524,201 A | | 6/1985 | Barnabeo et al. ........... 528/395 |
| 5,116,916 A | | 5/1992 | Young ........................ 525/350 |
| 5,211,875 A | | 5/1993 | Speer et al. ............ 525/188.28 |
| 5,294,689 A | | 3/1994 | McCallum, III et al. ..... 526/271 |
| 5,346,644 A | | 9/1994 | Speer et al. ........... 252/188.28 |
| 5,425,896 A | | 6/1995 | Speer et al. ........... 252/188.28 |
| 5,466,756 A | | 11/1995 | Roach et al. ............. 525/330.6 |
| 5,498,364 A | | 3/1996 | Speer et al. ........... 252/188.28 |
| 5,627,239 A | | 5/1997 | Ching et al. ............. 525/330.6 |
| 5,641,825 A | | 6/1997 | Bacskai et al. ............. 524/398 |
| 5,656,692 A | | 8/1997 | Hayes .......................... 525/63 |
| 5,660,761 A | | 8/1997 | Katsumoto et al. .... 252/188.28 |
| 5,700,554 A | | 12/1997 | Speer et al. ................. 428/220 |
| 5,736,616 A | | 4/1998 | Ching et al. ............. 525/330.3 |
| 5,744,246 A | * | 4/1998 | Ching ..................... 428/474.4 |
| 5,776,361 A | | 7/1998 | Katsumoto et al. .... 252/188.28 |
| 5,837,158 A | | 11/1998 | Shepodd et al. .......... 252/181.6 |
| 5,859,145 A | | 1/1999 | Ching et al. ............. 525/330.6 |
| 6,057,013 A | | 5/2000 | Ching et al. ................ 428/35.7 |
| 6,063,307 A | | 5/2000 | Shepodd et al. .......... 252/181.6 |
| 6,139,770 A | * | 10/2000 | Katsumoto et al. .... 252/188.28 |
| 6,333,087 B1 | | 12/2001 | Jerdee et al. .............. 428/35.9 |

FOREIGN PATENT DOCUMENTS

| | | |
|---|---|---|
| DE | 1 900 181 | 10/1969 |
| EP | 0 040 983 | 12/1981 |
| EP | 0 418 011 | 3/1991 |
| EP | 0 477 983 | 11/1996 |
| WO | WO95/02616 | 1/1995 |
| WO | WO96/40799 | 12/1996 |
| WO | WO99/48963 | 9/1999 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1–8 (Chicago, Jun. 19–20, 2000).

Ching et al., "Tasteless Oxygen Scavenging Polymers: A New Platform Technology for Food Packaging Based On Controlled Oxidation," *Oxygen Absorber . . . 2001 and Beyond*, OSP Conference Slides pp. 1–2–0 (Chicago, Jun. 19–20, 2000).

* cited by examiner

*Primary Examiner*—Michael C. Miggins

(57) ABSTRACT

Rigid containers are provided comprising oxygen scavenger compositions that produce only low levels of volatiles or by-products as a consequence of oxygen scavenging. In particular, a family of polymers containing selected cyclic olefinic pendent groups are used in the rigid containers to achieve oxygen scavenging that is associated with minimal or no organoleptic by-products after oxidation.

17 Claims, No Drawings

CONTAINER HAVING OXYGEN-SCAVENGING CORE LAYER

This is a continuation-in-part application of U.S. patent application Ser. No. 09/127,316 filed Jul. 31, 1998.

FIELD OF THE INVENTION

The present invention relates to rigid polymeric food or beverage containers comprising polyester such as polyester terephthalate or polyester naphthalate and oxygen scavenging polymer.

BACKGROUND OF THE INVENTION

Multilayer rigid container structures, which utilize an oxygen scavenging composition, are known. In the container wall, base polymers such as polyethylene terephthalate have been used along with an oxygen scavenger. The resulting multilayer package wall includes at least an oxygen scavenger core layer as well as inner and outer layers having high oxygen barrier qualities. The oxygen scavenger core layer is a combination of at least an oxygen-scavenging polymer with post consumer-polyethylene terephthalate (PC-PET). The inner and outer layers include at least oxygen barrier quality PET.

Furthermore, multilayer plastic bottles having oxygen-scavenging capacity sufficient to maintain substantially zero or near zero presence of oxygen in the bottle cavity under specified storage conditions have also been disclosed. The multilayer bottle wall has at least three layers. The inner and outer layers are PET or another bottling polyester, which define the bottle cavity and the outside skin of the bottle respectively. Between the inner and outer layers is an oxygen scavenging copolyester layer.

Condensation copolymers used for.making bottles with polyester such as PET or polyethylene napthalate (PEN) have also been disclosed. The condensation copolymers comprise predominantly polyester segments and an oxygen-scavenging amount of polyolefin oligomer segments. The copolymers are preferably formed by transesterification during reactive extrusion and typically comprise about 0.5 to about 12 wt. % of polyolefin oligomer segments. In a preferred embodiment, a bottle is provided having a multi-layer wall of at least three layers. The outer and inner layers are of unmodified PET and the oxygen scavenging layer in between the outer and inner layer is made of the condensation copolymers described above having an oxygen scavenging amount of polyolefin oligomers.

A transparent oxygen-scavenging article for packaging oxygen sensitive products is also known, the oxygen-scavenging article having a multilayered wall including at least three layers, an inner and outer layer of biaxially-oriented aromatic polyester polymers such as PET or PEN and an oxygen-scavenging aromatic ester polymer compatible with the polyester polymer. The oxygen-scavenging aromatic ester polymer must include ketone carbonyl groups to provide the oxygen-scavenging functionality and aromatic and ester groups for compatibility with the polyester.

PET containers have been disclosed that have a container wall of stretched plastic material with high oxygen barrier properties and an activating metal incorporated into the plastic material. The plastic material is PET in admixture with a polyamide and the metal is either added to the mixture or contained in one or both of the polymers.

A container containing at least one layer containing a plastics material and ions of at least one metal has also been disclosed. The plastics material in the layer consists of at least a partially split or degraded polyamide which has increased sensitivity to reaction with oxygen in the presence of metal thus giving the layer improved oxygen barrier properties.

A container has been disclosed with a wall having high oxygen barrier properties comprising a molded polymer composition, the composition comprising a granular mixture of (1) a first polymer composition providing strength for the article and (2) a second polymer composition providing strength for the article and (2) a second polymer composition compatible with the first polymer composition. The second polymer composition is obtainable by reacting a polyamide or copolyamide with a solution of a transition metal compound in a volatile solvent under refluxing conditions. The polymer of the first polymer composition can be any polymer and the metal of the metal compound reacted with the polyamide or copolyamide can be any transition metal. The amount of metal in the second polymer composition is at least 500 ppm.

A polymer material having increased sensitivity to reaction with oxygen has also been disclosed, the polymer material comprising a polyamide, which has been reacted with a nucleophilic reagent and possibly an activator. The nucleophilic reagent is selected from the group consisting of compounds containing at least one hydroxyl group, compounds containing at least one alkoxide group, phosphate compounds, pyrophosphate compounds, polyphosphate compounds, salts of organic acids and copolymer of vinyl alcohol and ethylene. The activator is in the form of a hydrogen donor. A process is also disclosed for producing the polymer material, which has increased sensitivity of reaction with oxygen. In the process, a polyamide reacts with the nucleophilic reagent under such conditions that the polymer material is obtained.

Such polymeric containers of PET, PEN and/or polyamide as described above utilize oxidizable components to react with and decrease the amount of oxygen in contact with oxygen sensitive materials packaged in containers. All of these oxidizable materials have the disadvantage of imparting unpleasant odor and/or taste to the packaged materials because of the byproducts given off during the oxidation of the oxidizable materials. Another problem is the uncontrolled oxidation fragmentation from the polymer backbone, which leads to chain secession, thus weakening the physical integrity of the multilayer container structures.

In contrast, the present invention achieves a rigid beverage and food container comprising PET and/or PEN, the container incorporating an oxygen scavenging component of cyclic olefin which does not give off odor and or taste as a result of its oxygen scavenging function. The oxidation also does not cause a change in molecular weight. This is because the cyclic olefin oxygen-scavenging component does not fragment as it oxidizes, thus avoiding the problem of imparting oxidation byproducts to the packaged material while maintaining the structural integrity.

Thus, the present invention overcomes, or at least reduces the effects of, one or more of the aforementioned problems.

Further aspects and advantages of the present invention will become apparent from the ensuing description, which is given by way of example only.

SUMMARY OF INVENTION

According to one aspect of the present invention, there are provided rigid containers containing oxygen scavenger compositions, said scavenger compositions comprising or including a polymer or oligomer having at least one cyclic olefinic group or functionality.

According to the present invention, a rigid container is provided containing an oxygen scavenging composition comprising a polymeric backbone and cyclic olefinic pendent groups. Optionally, the composition further comprises linking groups linking the olefinic pendent groups to the polymeric backbone.

Also according to the present invention, an oxygen scavenging composition is provided comprising a polymeric backbone and cyclic olefinic pendent groups. Optionally, the composition further comprises linking groups linking the olefinic pendent groups to the polymeric backbone and a transition metal catalyst.

Also according to the present invention, an article of manufacture is provided which is suitable as a rigid container, the container inhibiting oxidation of contents of the container by removing oxygen from the container and by inhibiting ingress of oxygen into the container from outside the container, the article comprising an oxygen scavenging composition which comprises a polymeric backbone and cyclic olefinic pendent groups. Optionally, the composition further comprises linking groups linking the olefinic pendent groups to the backbone, and a transition metal catalyst. In another preferred embodiment of the invention, the odor and taste characteristics of products packaged with rigid containers comprised of the above compositions, article, layer and process are not adulterated as a result of oxidation of the composition.

In still another preferred embodiment of the invention, there is no significant fragmentation of the olefinic pendent groups and linking groups from the polymeric backbone as a result of oxidation of the above compositions, article, layer and process.

In yet another preferred embodiment of the invention, the transition metal catalyst of the above oxygen scavenging composition, article of manufacture, layer and process is a metal salt.

In still another preferred embodiment of the invention, the metal in the metal salt of the above oxygen scavenging composition, article of manufacture, layer and process is cobalt.

In still another preferred embodiment of the invention, the metal salt of the above oxygen scavenging composition, article of manufacture, layer and process is selected from the group consisting of cobalt neodecanoate, cobalt 2-ethylhexanoate, cobalt oleate and cobalt stearate.

In yet another preferred embodiment of the invention, the composition of the above oxygen scavenging composition, article of manufacture, layer and process further comprises at least one triggering material to enhance initiation of oxygen scavenging.

In still another preferred embodiment of the invention, the triggering material of the above oxygen scavenging composition, article of manufacture, layer and process is a photoinitiator.

In yet another preferred embodiment of the invention, the molded or thermoformed shape of the above article of manufacture is a bottle.

In still another preferred embodiment of the invention, the oxygen scavenging layer is adjacent to one or more additional layers.

In still another preferred embodiment of the invention, at least one of the additional layers adjacent to the above layer is an oxygen barrier.

In still another preferred embodiment of the invention, the oxygen barrier of the above layer comprises a member of the group consisting of poly(ethylene-vinyl alcohol), polyacrylonitrile, poly(vinyl chloride), polyamides, poly(vinylidene dichloride), poly(ethylene terephthalate), silica, metal foil and metalized polymeric films.

In still another preferred embodiment of the invention, the one or more of said additional layer or layers of the above layer is coextruded with the above layer.

The present invention also relates to a rigid container for food or beverage, the container being molded from a resin comprising the above-described non-odorous oxygen scavenging polymer composition.

The present invention also relates to the above-described rigid container further comprising a tinted ultraviolet protection layer, which may or may not be the food contact layer, located between the layer comprising the non-odorous oxygen scavenging composition and the inside of the rigid container.

In yet another more preferred embodiment of the rigid container comprises a multilayered structure having one or more layers in addition to an oxygen scavenging layer, the other layer(s) being an aromatic polyester or copolyester selected from the group consisting of polyethylene terephthalate, polyethylene naphthalate, polypropylene terephthalate, polybutylene terephthalate, polyethylene isophthalate, polycyclohexanedimethanol terephthalate, polybutylene naphthalate, polycyclohexanedimethanol naphthalate, and copolymers and blends thereof.

In still another more preferred embodiment, the composition of the resin of the above-described rigid container is a single layer.

In yet another more preferred embodiment, the composition of the resin of the above-described rigid container is multilayered.

In yet another more preferred embodiment, the composition of the resin of the above-described rigid container comprises an outer air contact layer and an inner oxygen scavenging layer.

In still another more preferred embodiment, the outer air contact layer of the composition of the resin of the above-described rigid container comprises an oxygen barrier resin selected from the group consisting of polyethylene terephthalate, polyethylene naphthalate and a mixture of polyethylene terephthalate and polyethylene naphthalate.

In yet another more preferred embodiment, the composition of the resin of the above-described rigid container further comprises at least one of an inner food contact layer, a tie layer, and a tinted ultraviolet protection layer.

In still another more preferred embodiment, the inner food contact layer of the composition of the resin of the above-described rigid container comprises an oxygen barrier resin selected from the group consisting of polyethylene terephthalate, polyethylene naphthalate and a mixture of polyethylene terephthalate and polyethylene naphthalate.

In yet another more preferred embodiment, the oxygen scavenging of the composition of the resin of the above-described rigid container is initiated by moisture or actinic radiation.

In still another more preferred embodiment, the transition metal catalyst of the composition of the resin of the above-described rigid container is a metal salt.

In yet another more preferred embodiment, the metal in the metal salt of the transition metal catalyst of the composition of the resin of the above-described rigid container is cobalt.

In still another more preferred embodiment, the metal salt of the transition metal catalyst of the composition of the resin of the above-described rigid container is selected from the group consisting of cobalt neodecanoate, cobalt 2-ethylhexanoate, cobalt oleate and cobalt stearate.

In yet another more preferred embodiment, the composition of the resin of the above-described rigid container further comprises at least one triggering material to enhance initiation of oxygen scavenging.

In still another more preferred embodiment, the triggering material of the resin of the composition of the above-described rigid container is a photoinitiator.

In yet another more preferred embodiment, the photoinitiator of the resin of the composition of the above-described rigid container has an ultraviolet absorption window above 320 nm.

In still another more preferred embodiment, the above-described rigid container is suitable for packaging oxygen sensitive drinks for extended freshness and shelf life.

In yet another more preferred embodiment, the above-described rigid container is suitable for packaging beer, wine, fruit juice, or another oxygen sensitive drink.

DETAILED DESCRIPTION OF THE INVENTION

The present invention provides a rigid container for food or beverage, the container being molded from a resin comprising a non-odorous oxygen scavenging polymer composition having a polymer backbone and cyclic olefinic pendant groups, alkyl acrylate pendant groups, or a combination thereof. Optionally, the composition further comprises linking groups linking the pendant groups to the polymer backbone.

The oxygen scavenging compositions are used in the preparation of rigid and semi rigid packaging materials, containers and the like. Typical rigid and semi rigid articles include plastic, paper or cardboard cartons, bottles such as juice containers and beer containers, thermoformed trays or cups, with wall thicknesses generally greater than about 0.75 mil. The walls of such articles can comprise single or multiple layers of materials.

In many embodiments, the rigid container will comprise a multilayered structure having one or more barrier layers in addition to an oxygen scavenging layer, the barrier layer(s) being typically made from an aromatic polyester or copolyester, such as those selected from the group consisting of polyethylene terephthalate, polyethylene naphthalate, polypropylene terephthalate, polybutylene terephthalate, polyethylene isophthalate, polycyclohexanedimethanol terephthalate, polybutylene naphthalate, polycyclohexanedimethanol naphthalate, poly(ethylene vinyl alcohol), polyacrylonitrile, polyvinyl chloride, poly(vinylidene dichloride), silica, polyamides, nylon, MXD6, or copolymers or blends thereof.

In one particularly illustrative embodiment, rigid containers are provided that comprise at least an outer layer, an inner layer and an oxygen scavenging layer between the inner and outer layers, wherein the oxygen scavenging layer is prepared from an oxygen scavenging composition disclosed herein and wherein the inner and outer layers of the rigid container are comprised of an aromatic polyester or copolyester, such as those selected from the group consisting of polyethylene terephthalate, polyethylene naphthalate, polypropylene terephthalate, polybutylene terephthalate, polyethylene isophthalate, polycyclohexanedimethanol terephthalate, polybutylene naphthalate, polycyclohexanedimethanol naphthalate, poly(ethylene vinyl alcohol), polyacrylonitrile, polyvinyl chloride, poly(vinylidene dichloride), silica, polyamides, nylon, MXD6, or copolymers or blends thereof. The oxygen scavenging compositions are particularly useful in producing beverage bottles, such as blown or molded beverage bottles, the fabrication of which is a well developed art. One illustrative example of a rigid container according to the present invention is a rigid bottle having a bottle wall comprised of at least a three-layer structure. The three-layer structure in accordance with this aspect of the invention comprises an inner layer and an outer layer, both being comprised of polyesters or copolyesters, preferably aromatic polyesters or copolyesters, and a core layer between the inner and outer layers, the core layer being comprised of an oxygen scavenging layer made from an oxygen scavenging composition disclosed herein.

Rigid containers having multi-layered structures are preferably produced by coextrusion. For example, one layer of an oxygen scavenging composition described herein can be coextruded with two layers of polyester or copolyester, e.g., PET, PEN, and the like. Although coextrusion will typically be preferred for producing the rigid containers described herein, other approaches available within the art and can also be used, e.g., coating with solutions, heat fusion of separate layers, etc.

It is an advantage of this invention that the adhesion between the oxygen scavenging core layer and the inner and outer polyester layers is sufficiently strong that a be layer will not generally be needed. However, if desired or necessary for a given implementation of the invention, additional non-polyester layers can be incorporated into the multi-layer structures to improve adhesion, improve barrier properties, reduce costs, etc.

The oxygen scavenging compositions can be used as the sole polymeric material from which one or more layers of a container are formed (i.e., the film can be a multilayer structure), it can be blended with other polymeric oxygen scavenging agents (such as polybutadiene) or it can be blended with one or more diluent polymers which are known to be useful in the formation of packaging containers and which often can render the resultant material more processable. Suitable diluent polymers include, but are not limited to, polyethylene such as, for example, low density polyethylene, very low density polyethylene, ultra-low density polyethylene, high density polyethylene, and linear low density polyethylene; polyesters such as, for example, polyethylene terephthalate (PET); polyvinyl chloride (PVC); polyvinylidene chloride (PVDC); and ethylene copolymers such as ethylene/vinyl acetate copolymer, ethylene/alkyl (meth)acrylate copolymers, ethylene/(meth)acrylic acid copolymers, and ionomers. Blends of different diluent polymers also can be used.

Oxygen scavenger compositions useful in the context of this invention, as well as methods for their preparation, have been described in U.S. patent application Ser. No. 09/127,316, the disclosure of which is incorporated herein by reference in its entirety.

The oxygen scavenging compositions used in producing the rigid containers according to the invention broadly comprise (a) a polymer backbone, preferably an ethylenic backbone; (b) cyclic olefinic pendent groups; and (c) a transition metal catalyst. Optionally, the composition further comprises linking groups linking the backbone with the pendent groups. The polymer composition can also optionally contain alkyl acrylate pendant groups, e.g., methyl acrylate pendant groups.

In certain illustrative embodiments of the invention, the polymeric backbone of the oxygen scavenging compositions is ethylenic and the linking groups are selected from the group consisting of

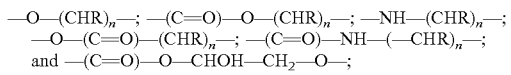

wherein R is hydrogen or an alkyl group selected from the group consisting of methyl, ethyl, propyl and butyl groups and where n is an integer in the range from 1 to 12.

In additional embodiments of the invention, the cyclic olefinic pendent groups of the above compositions have the structure (II):

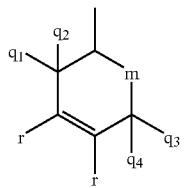

(II)

where $q_1$, $q_2$, $q_3$, $q_4$, and r are selected from the group consisting of —H, —$CH_3$, and —$C_2H_5$; and where m is —$(CH_2)_n$— with n being an integer in the range from 0 to 4; and wherein, when r is —H, at least one of $q_1$, $q_2$, $q_3$ and $q_4$ is —H. In still other embodiments of the invention, the polymeric backbone, linking groups and cyclic olefinic pendent groups of the above compositions comprise repeating units, each unit having a structure (III) as follows:

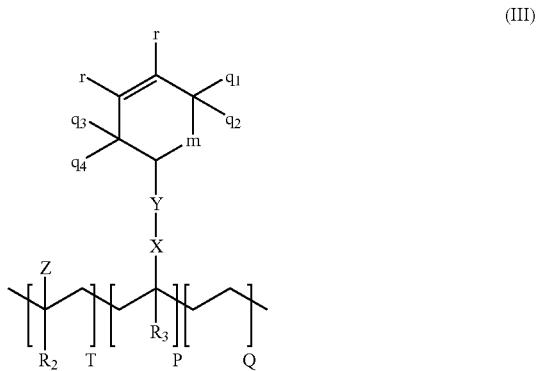

(III)

wherein P+T+Q is 100 mol % of the total composition; P is greater than 0 mol % of the total composition; Z is selected from the group consisting of an aryl group; —(C=O)$OR_1$; —O(C=O)$R_1$; and an alkyl aryl group, structure (IV):

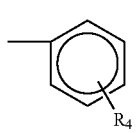

(IV)

where $R_4$ is selected from the group consisting of —$CH_3$, —$C_2H_5$, and —H; $R_1$ is selected from the group consisting of —H, —$CH_3$, —$C_2H_5$, —$C_3H_7$ and —$C_4H_9$; $R_2$ and $R_3$ are selected from the group consisting of —H and —$CH_3$; X is selected from the group consisting of —O—, —NH—, —(C=O)O—, —(C=O)NH—, —(C=O)S—, —(C=O)— and —(CHR)$_\lambda$—; $\lambda$ is an integer in the range from 1 to 6; Y is —(CHR)$_n$—, where n is an integer in the range from 0 to 12, R being selected from the group consisting of —H, —$CH_3$ and —$C_2H_5$; where $q_1$, $q_2$, $q_3$, $q_4$, and r are selected from the group consisting of —H, —$CH_3$, and —$C_2H_5$; and where m is —(CH$_2$)$_n$— and where n is an integer in the range from 0 to 4; and wherein when r is —H, at least one of $q_1$, $q_2$, $q_3$ and $q_4$ is —H.

In other embodiments of the invention, the cyclic olefinic pendent groups of the above compositions and rigid containers are selected from the group consisting of cyclohexene-4-methylene radical, 1-methyl cyclohexene-4-methylene radical, 2-methyl cyclohexene-4-methylene radical, 5-methyl cyclohexene-4-methylene radical, 1,2-dimethyl cyclohexene-4-methylene radical, 1,5-dimethyl cyclohexene-4-methylene radical, 2,5-dimethyl cyclohexene-4-methylene radical, 1,2,5-trimethyl cyclohexene-4-methylene radical, cyclohexene-4-ethylene radical, 1-methyl cyclohexene-4-ethylene radical, 2-methyl cyclohexene-4-ethylene radical, 5-methyl cyclohexene-4-ethylene radical, 1,2-dimethyl cyclohexene-4-ethylene radical, 1,5-dimethyl cyclohexene-4-ethylene radical, 2,5-dimethyl cyclohexene-4-ethylene radical, 1,2,5-trimethyl cyclohexene-4-ethylene radical, cyclohexene-4-propylene radical, 1-methyl cyclohexene-4-propylene radical, 2-methyl cyclohexene-4-propylene radical, 5-methyl cyclohexene-4-propylene radical, 1,2-dimethyl cyclohexene-4-propylene radical, 1,5-dimethyl cyclohexene-4-propylene radical, 2,5-dimethyl cyclohexene-4-propylene radical, and 1,2,5-trimethyl cyclohexene-4-propylene radical.

In additional embodiments, the oxygen scavenging polymers further comprise alkyl acrylate pendant groups in addition to the cyclic olefinic pendant groups. Therefore, the polymer compositions can include copolymers of ethylene and acrylic or methacrylic esters of linear, branched or cyclic alkanols having, for example, 1–28 carbon atoms, or terpolymers further containing the cyclic olefinic pendant groups described herein.

In a preferred embodiment, the polymer comprises an ethylenic backbone having both alkyl acrylate and cyclic olefinic pendant groups linked to the ethylenic backbone. Such polymers are also referred to as ethylene/alkyl acrylate/cyclohexenyl alkyl acrylate terpolymers. One particularly preferred polymer comprises an ethylene/methyl acrylate/cyclohexenyl methyl acrylate terpolymer, referred to as EMCM.

The oxygen scavenging compositions may be polymeric in nature or they may be lower molecular weight materials. For most rigid bottle applications, the oxygen scavenging compositions will be polymeric in nature and have molecular weights greater than about 2000 Da. In any case, they may be blended with further polymers or other additives, if desired, to best suit the needs of a given implementation. In the case of low molecular weight materials they will most likely be compounded with a carrier resin before use.

The oxygen scavenging compositions of the present invention will generally further include a transition metal compound as an oxygen scavenger catalyst. The transition metal catalyst can be a salt which includes a metal selected from the first, second, or third transition series of the Periodic Table. The metal preferably is Rh, Ru, or one of the elements in the series of Sc to Zn (i.e., Sc, Ti, V, Cr, Mn, Fe, Co, Ni, Cu, and Zn), more preferably at least one of Mn, Fe, Co, Ni, and Cu, and most preferably Co. Suitable anions for such salts include, but are not limited to, chloride, acetate, oleate, stearate, palmitate, 2-ethylhexanoate, neodecanoate, and naphthenate. Representative salts include cobalt (II)

2-ethylhexanoate, cobalt oleate, and cobalt (II) neodecanoate. (The metal salt also can be an ionomer, in which case a polymeric counterion is employed.)

When used in forming a packaging article, the oxygen scavenging composition of the present invention can include only the above-described polymers and a transition metal catalyst. However, photoinitiators can be added to further facilitate and control the initiation of oxygen scavenging properties. Adding a photoinitiator or a blend of photoinitiators to the oxygen scavenging composition can be preferred, especially where antioxidants have been added to prevent premature oxidation of the composition during processing and storage.

Suitable photoinitiators are known to those skilled in the art. See, e.g., PCT Publication WO 97/07161, WO 97/44364, WO 98/51758, and WO 98/51759, the teachings of which are incorporated herein by reference as if set forth in full. Specific examples of suitable photoinitiators include, but are not limited to, benzophenone, and its derivatives, such as methoxybenzophenone, dimethoxybenzophenone, dimethylbenzophenone, diphenoxybenzophenone, allyloxybenzophenone, diallyloxybenzophenone, dodecyloxybenzophenone, dibenzosuberone, 4,4'-bis(4-isopropylphenoxy)benzophenone, 4-morpholinobenzophenone, 4-aminobenzophenone, tribenzoyl triphenylbenzene, tritoluoyl triphenylbenzene, 4,4'-bis(dimethylamino)-benzophenone, acetophenone and its derivatives, such as, o-methoxyacetophenone, 4'-methoxyacetophenone, valerophenone, hexanophenone, α-phenyl-butyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones, α-tetralone, acenaphthenequinone, 9-acetylphenanthrene, 2-acetyl-phenanthrene, 10-thioxanthenone, 3-acetylphenanthrene, 3-acetylindole, 9-fluorenone, 1-indanone, 1,3,5-triacetylbenzene, thioxanthen-9-one, isopropylthioxanthen-9-one, xanthene-9-one, 7-H-benz[de]anthracen-7-one, 1'-acetonaphthone, 2'-acetonaphthone, acetonaphthone, benz[de]anthracen-7-one, 1'-acetonaphthone, 2'-acetonaphthone, acetonaphthone, benz[a]anthracene-7,12-dione, 2,2-dimethoxy-2-phenylacetophenone, α,α-diethoxyacetophenone, α,α-dibutoxyacetophenone, 4-benzoyl4'-methyl(diphenyl sulfide) and the like. Single oxygen-generating photosensitizers such as Rose Bengal, methylene blue, and tetraphenylporphine as well as polymeric initiators such as poly (ethylene carbon monoxide) and oligo[2-hydroxy-2-methyl-1-[4-(1-methylvinyl)phenyl]propanone] also can be used. However, photoinitiators are preferred because they generally provide faster and more efficient initiation. When actinic radiation is used, photoinitiators can provide initiation at longer wavelengths which are less costly to generate and present less harmful side effects than shorter wavelengths.

Photoinitiators that are especially useful in the present invention include benzophenone derivatives containing at least two benzophenone moieties, as described in copending U.S. patent application Ser. No. 08/857,325, filed May 16, 1997. These compounds act as effective photoinitiators to initiate oxygen scavenging activity in oxygen scavenging compositions. Such benzophenone derivatives have a very low degree of extraction from oxygen barrier compositions, which may lead to reduced malodor or off-taste of a packaged food, beverage, or oral pharmaceutical product by extracted photoinitiator.

A "benzophenone moiety" is a substituted or unsubstituted benzophenone group. Suitable substituents include alkyl, aryl, alkoxy, phenoxy, and alicylic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

wherein A is a bridging group selected from sulfur; oxygen; carbonyl; —SiR"$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'''—, wherein R''' is an alkyl group containing 1 to 12 carbon atoms, an aryl group containing 6 to 12 carbon atoms, or hydrogen; or an organic group containing from 1 to 50 carbon atoms; a is an integer from 0 to 11; B is a substituted or unsubstituted benzophenone group; and b is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as an ether, ketone, ester, or alcohol.

The substituents of B, herein R'', when present, are individually selected from alkyl, aryl, alkoxy, phenoxy, or alicylic groups containing from 1 to 24 carbon atoms, or halides. Each benzophenone moiety can have from 0 to 9 substituents. Substituents can be selected to render the photoinitiator more compatible with the oxygen scavenging composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

When a photoinitiator is present, it can enhance and/or facilitate the initiation of oxygen scavenging by the composition of the present invention upon exposure to radiation. The amount of photoinitiator can depend on the amount and type of cyclic unsaturation present in the polymer, the wavelength and intensity of radiation used, the nature and amount of antioxidants used, and the type of photoinitiator used. The amount of photoinitiator also can depend on how the scavenging composition is used. For instance, if a photoinitiator-containing composition is in a film layer, which underneath another layer is somewhat opaque to the radiation used, more initiator might be needed. However, the amount of photoinitiator used for most applications ranges from about 0.01 to about 10% (By wt.) of the total composition. Oxygen scavenging can be initiated by exposing an article containing the composition of the present invention to actinic or electron beam radiation.

One or more antioxidants can be incorporated into the scavenging composition of the present invention to retard degradation of the components during compounding and rigid container formation. Although such additives prolong the induction period for oxygen scavenging activity to occur in the absence of irradiation, the layer or article (and any incorporated photoinitiator) can be exposed to radiation at the time oxygen scavenging properties are required. Suitable antioxidants include 2,6-di(t-butyl)-4-methylphenol(BHT), 2,2'-methylene-bis(6-t-butyl-p-cresol), triphenylphosphite, tris(nonylphenyl)phosphite, dilaurylthiodipropionate, vitamin E ($\alpha$-tocopherol), octadecyl 3,5,-di-tert-butyl-4-hydroxyhydrocinnamate, tetrakis[methylene(3,5-di-tert-butyl-4-hydroxyhydrocinnamate)]methane and the like.

When an antioxidant is included as part of the composition of the present invention, it preferably is present in an amount which prevents oxidation of the components of the oxygen scavenging composition as well as other materials present in a resultant blend during formation and processing; however, the amount preferably is less than that which interferes with the scavenging activity of the resultant layer, film, or article after initiation has occurred. The amount needed in a given composition can depend on the components present therein, the particular antioxidant used, the degree and amount of thermal processing used to form the shaped article, and the dosage and wavelength of radiation applied to initiate oxygen scavenging. Typically, such antioxidant(s) are used in an amount of from about 0.01 to about 1% (by wt.).

Other additives that also can be included in the oxygen scavenging composition of the present invention include, but are not necessarily limited to, fillers, pigments, dyestuffs, processing aids, plasticizers, nucleating agents, antifog agents, antiblocking agents, blowing agents, and the like. Few, if any, of these typical additives will be used for bottle applications that require clarity. However, as will be appreciated by those of ordinary skill in the art, inclusion of such additives yields oxygen scavenging compositions that are nonetheless within the spirit of this invention.

The amounts of the components used in the oxygen scavenging composition of the present invention can affect the use and effectiveness of this composition. Thus, the amounts of polymer, transition metal catalyst, and any photoinitiator, antioxidant, polymeric diluents, additives, etc., can vary depending on the desired article and its end use. For example, one of the primary functions of the polymer described above is to react irreversibly with oxygen during the scavenging process, while a primary function of the transition metal catalyst is to facilitate this process. Thus, to a large extent, the amount of polymer present affects the oxygen scavenging capacity of the composition, i.e., the amount of oxygen that the composition can consume, while the amount of transition metal catalyst affects the rate at which oxygen is consumed as well as the induction period.

The composition of the present invention can provide oxygen scavenging properties at a desirable rate and capacity while having good processing and compatibility properties relative to compositions including conventional non-cyclic ethylenically unsaturated polymers. Thus, the present composition can be used to provide, by itself or as a blend with diluent film-forming polymers such as polyolefins and the like, a rigid container that can be manufactured and processed easily. Further, the subject oxygen scavenging composition will deplete the oxygen within a package cavity without substantially detracting from the color, taste, and/or odor of the product contained therein.

The amount of the polymeric scavenging component contained in the subject composition can range from about 1 to almost about 100%, preferably from about 5 to about 97.5%, more preferably from about 10 to about 95%, even more preferably from about 15 to about 92.5%, still more preferably from about 20 to about 90%, (with all the foregoing percentages being by weight) of the composition or layer made therefrom. Typically, the amount of transition metal catalyst can range from 0.001 to 1% (by wt.) of the scavenging composition, based on the metal content only (i.e., excluding ligands, counterions, etc.). Where one or more other scavenging compounds and/or diluent polymers are used as part of the composition, such other materials can make up as much as 99%, preferably up to about 75%, by weight of the scavenging composition. Any further additives employed normally do not make up more than 10%, preferably no more than about 5%, by weight of the scavenging composition.

One embodiment of the invention provides for including a photoinitiator as part of the subject oxygen scavenging composition and subjecting a rigid article that includes such a composition to radiation so as to initiate oxygen scavenging at desired rates.

The initiating radiation preferably is actinic, e.g., UV or visible light having a wavelength of from about 200 to about 750 nm, preferably of from about 200 to 600 nm, and most preferably from about 200 to 400 nm. Such light can be delivered in a continuous or pulsed manner. The rigid article containing the oxygen scavenging composition preferably is exposed to such radiation until it receives at least about 0.01 J/g of radiation, more preferably until it receives a dose in the range of about 0.1 to about 500 J/g. The radiation also can be electron-beam radiation at a dosage of at least about 2 kiloGray (kG), preferably from about 10 to about 100 kG. Other potential sources of radiation include ionizing radiation such as gamma, X-ray, and corona discharge. Duration of exposure depends on several factors including, but not limited to, the amount and type of photoinitiator present, thickness of the layers to be exposed, thickness and opacity of intervening layers, amount of any antioxidant present, and the wavelength and intensity of the radiation source.

When using oxygen scavenging layers or articles, irradiation can occur during or after the layer or article is prepared. If the resulting layer or articles is to be used to package an oxygen sensitive product, exposure can be just prior to, during, or after packaging. For best uniformity of radiation, exposure preferably occurs at a processing stage where the layer or article is in the form of a flat sheet. For further information on initiation via irradiation, the reader is directed to PCT publications WO 98/05555 and WO 98/05703, as well as PCT 97/13598, 97/13370, 97/13369, the teachings of which are incorporated herein by reference.

Determining the oxygen scavenging rate and capacity of a given oxygen scavenging composition contemplated for a particular use can be beneficial. To determine the rate, the time elapsed.before the scavenger depletes a certain amount of oxygen from a sealed container is measured. In some instances, the rate can be determined adequately by placing a film containing the desired scavenging composition in an air-tight, sealed container of an oxygen containing atmosphere, e.g., air which typically contains 20.6% (by vol.) $O_2$. Over time, samples of the atmosphere inside the container are removed to determine the percentage of oxygen remaining. (Usually, the specific rates obtained vary under different temperature and atmospheric conditions. Atmospheres having lower initial oxygen content and/or maintained under low temperature conditions provide a more stringent test of the scavenging ability and rate of a composition. The rates which follow are at room temperature and one atmosphere of air, unless otherwise specified.) When an active oxygen barrier is needed, a useful scavenging rate can be as low as about 0.05 cm$^3$ oxygen per gram of the polymer in the scavenging composition per day in air at 25° C. and at 1 atm (101.3 kPa). However, in most instances, the present composition has a rate equal to or greater than about 5.8×10$^{-8}$ cm$^3$/g.s(0.5 cm$^3$/g.day), even up to or greater than about 5.8×10$^{-5}$ $^{cm3}$/g.s (5 cm$^3$/g.day). Further, films or layers including the subject composition are capable of a scavenging rate greater than about 1.2×10$^{-4}$ cm$^3$/m$^2$.s (10 cm$^3$/m$^2$.day) and under some conditions, greater than about 2.9×10$^{-4}$ cm$^3$/m$^2$.s (25 cm$^3$/m$^2$.day). (Generally, films or layers deemed suitable for use as an active oxygen barrier can have a scavenging rate as low as 1.2×10$^{-5}$ cm$^3$/m$^2$.s (1 cm$^3$/m$^2$.day) when measured in air at 25° C. and 101 kPa (1 atm). Such rates make those layers suitable for scavenging oxygen from within a package, as well as suitable for active oxygen barrier applications.

When the method of the present invention is to be used in an active oxygen barrier application, the initiated oxygen scavenging activity, in combination with any oxygen barriers, preferably creates an overall oxygen permeance of less than about 1.1×10$^{-10}$ cm$^3$/m$^2$.s.Pa (1.0 cm$^3$/m$^2$.day.atm) at 25° C. The oxygen scavenging capacity preferably is such that this value is not exceeded for at least two days.

Once scavenging has been initiated, the scavenging composition, layer, or article prepared therefrom preferably is able to scavenge up to its capacity, i.e., the amount of oxygen which the scavenger is capable of consuming before it becomes ineffective. In actual use, the capacity required for a given application can depend on the quantity of oxygen initially present in the package, the rate of oxygen entry into the package in the absence of the scavenging property, and the intended shelf life for the package. When using scavengers that include the composition of the present invention, the capacity can be as low as 1 cm$^3$/g, but can be 50 cm$^3$/g or higher.

In a rigid container having polyester or copolyester oxygen barrier layers, it is preferable that the combination of oxygen barriers and the oxygen scavenging layers create an overall oxygen transmission rate of less than about 1.0 cubic centimeter-mil per square meter per day per atmosphere pressure at 25° C. Another definition of acceptable oxygen scavenging is derived from testing actual packages. In actual use, the scavenging rate requirement will largely depend on the internal atmosphere of the package, the contents of the package and the temperature at which it is stored.

The scavenging rate of the rigid article will depend primarily on the amount and nature of the oxygen scavenging composition in the article, and secondarily on the amount and nature of other additives (e.g., diluent polymer, antioxidant, etc.) which are present in the scavenging component, as well as the overall manner in which the container is fabricated, e.g., surface area/volume ratio.

The oxygen scavenging capacity of rigid container of the invention can be measured by determining the amount of oxygen consumed until the article becomes ineffective as a scavenger. The scavenging capacity of the package will depend primarily on the amount and nature of the scavenging moieties present in the article. Alternatively, the effectiveness of an oxygen scavenging polymer can be determined from the oxygen transmission rate through the film. An effective oxygen scavenging polymer should be able to block most, if not all, oxygen transmission through the film.

The following examples are provided to demonstrate certain illustrative embodiments of this invention. It should be appreciated by those skilled in the art that the techniques disclosed in the examples which follow represent those found by the inventors to function in the practice of the invention and thus can be considered to constitute examples of illustrative modes for its practice. However, those skilled in the art should, in light of the present disclosure, appreciate that many changes can be made in the specific embodiments which are disclosed and still obtain a like or similar result without departing from the spirit and scope of the invention.

EXAMPLES

Objects and advantages of this invention are further illustrated by the following examples. The particular materials and amounts thereof, as well as other conditions and details, recited in these examples should not be used to unduly limit this invention.

Example 1

Preparation of EMCM

The preparation of EMCM and like polymers has been described, for example in U.S. patent application Ser. No. 09/127,316, the disclosure of which is incorporated herein by reference in its entirety.

In one example, 600 ml of decalin was placed in a flask. To this was added 334 grams of Chevron SP-2260 (0.9330 moles of methyl acrylate) and 0.44 g of Irganox® 1010 (0.1% mole). The temperature of the mixture was gradually raised while stirring. When the temperature reached approximately 120° C., 104.6 g (0.93 moles) of cyclohex-1-ene-4-methanol was added. When the temperature reached approximately 140° C., 4.4 g of the catalyst Ti(OC$_2$H$_5$)$_4$ was added a portion at a time. The temperature was maintained at 160° C. while stirring. The course of the reaction was observed by subjecting samples of the mixture to NMR at hourly intervals. The percent conversion is given in Table 2 below. After 3 hours of reaction, the mixture was cooled and 400 ml of CHCl$_3$ was added and the mixture was then precipitated by adding it to 4 liters of CH$_3$OH in a Waring blender. The precipitate was filtered and washed with CH$_3$OH and dried in a vacuum oven at 50° C. The dried mixture yielded 380.5 g of polymer.

TABLE 2

| Time (hours) | Percent Conversion |
|---|---|
| 1 hour | 43.8% |
| 2 hours | 56.7% |
| 3 hours | 55.7% |

185 grams of the above-prepared polymer was combined with 45 ml normal hexane and 1.54 g cobalt-neodecanoate resulting in 1000 ppm of cobalt ion and 0.0185 g Irganox® 1010 resulting in 100 ppm Irganox®. The mixture was heated and blended and then dried in a vacuum-oven. The resulting compound was extruded into a film.

Additionally, 185 grams of the above-prepared polymer was combined with 45 ml normal hexane and 1.54 g cobalt-neodecanoate (resulting in 1000 ppm of cobalt ion) and 0.046 g Irganox® 1010 (resulting in 250 ppm Irganox®). The mixture is heated and blended and then dried in a vacuum-oven. The resulting compound is extruded into a film.

In another example, ethylene-methyl acrylate copolymer (EMAC) was fed into a Werner & Pfleiderer ZSK-30 twin screw extruder at 6 kg/hr, and the reactants and catalysts were added to the extruder in a subsequent reaction zone. The catalyst Ti(OC$_3$H$_7$)$_4$ was added with the reactants at 3 mol % or at a rate of 148 cc/hr. Irganox®/Toluene solution was added at 4.5 g/900 cc using a Milton Roy 29/290 mini-pump. To obtain 100 ppm of Irganox®, it must be added at 2.2 cc/min. To obtain 50 ppm of Irganox, it must be added at 1.1 cc/min. Cyclohexane methyl alcohol with 1,000 ppm of an antioxidant of BHT was added via a Milton Roy dual head at 1958 cc/hr. Steam is injected into the system at 800 cc $H_2O$/Hr at the end of the reaction zone.

51 lbs of EMCM product (100 ppm Irganox® 1010, 59.3% methyl alcohol (MA), 2.98 g/10 min. Melt Flow) was produced over a period of approximately 2 hours.

In another example, 45 lbs of EMCM product (100 ppm lrganox® 1010, 2.38 g/10 min Melt Index) was extruded over a period of approximately 3 hours. A dual steam stripping setup was used in which pressurized injectors at zones 4 and 11 of the extruder pumped steam at 1076 cc/hr and 728 cc/hr, respectively. Both injectors were Pulse 680 pumps with a pressure of at least 800 psi, except at the first measured time interval when injector (No. 4) was measured at 500–550 psi and injector (No. 11) was measured at 500 psi.

Example 2

Preparation of PET/EMCM/PET Rigid Multi-layer Structures

Multilayer films were made on a Randcastle extruder. Commercial bottle grade PET was dried at about 150° C. for about 3 hours in a vacuum oven. The oxygen scavenging polymer was compounded on a Haake twin screw extruder at 170° C. from 90 wt. % EMCM and 10 wt. % EMAC based cobalt masterbatch (containing 1 wt. % $BBP^3$ photoinitiator and 1 wt. % cobalt as cobalt oleate). The feedblock for PET was set to 265–290° C. and that for oxygen scavenging polymer was set to 170–180° C. The die temperature was set to 265–290° C.

Oxygen transmission testing was done on a Mocon Ox-Trans 2/20 ML system at 23° C. Nitrogen containing 2% hydrogen was used as carrier gas to flush both sides of the film at 10 cc/min flow rate for 1–4 hrs before testing. Air was used as test gas at 10 cc/min flow rate.

Tests were performed using Mylar film, unoriented monolayer film made from bottle grade PET, PET/OSP/PET unoriented 3-layer films tested as is, and PET/OSP/PET unoriented 3-layer films tested after a 10 minute exposure to UV light (~254nm). The following results were obtained.

OTR Data for EMCM/PET Multilayer Films

| Film | Thickness (mil) | Oxygen Transmission Rate ($ccO_2/m^2$/day) |
|---|---|---|
| Mylar film (oriented commercial PET film) | 0.92 | 35–60 |
| Unoriented film made from Bottle Grade PET | 2.0 | 132 |
| PET/OSP/PET 3-layer film Unoriented, tested as is | 3.8 (1/2/1) | 165 |
| PET/OSP/PET 3-layer film Unoriented, tested after 10 min to 254 nm UV at 1 inch to receive 5 J/$cm^2$** | 3.8 (1/2/1) | 0–6* |

OSP: EMCM with 10% Co masterbatch.
*3 out of 4 readings were 0, and 1 out of 4 was 6 $ccO_2/m^2$/day.
**PET outlayer film will block most of the UV light, it is estimated that the OSP core layer will receive about 100 mJ/$cm^2$ UV light.

Example 3

A PET/OSP/PET multilayer structure is made essentially as described in Example 2, except that the film is UV triggered with Mercury Arc UV lamp with long wavelength, e.g., 355 nm–375 nm, before OTR test.

Example 4

A PET/OSP/PET multilayer structure is made essentially as described in Example 2, except that the film is made with a core layer containing 90 wt. % EMCM and 10 wt. % cobalt masterbatch which contains 1 wt. % cobalt as cobalt oleate and 1 wt. % of Irgacure 369, Irgacure 500, Irgacure 651, Irgacure 819, Irgacure 1700, Irgacure 4265 (all available from Ciba Corporation), or TPO (available from BASF).

Example 5

A PET/OSP/PET multilayer structure is made essentially as described in Example 2, except that the film is made with a core layer containing 90 wt. % EMCM and 10 wt. % cobalt masterbatch which contains 1 wt. % cobalt as cobalt oleate and no photoinitiator.

Example 6

A PET/OSP/PET multilayer structure is made essentially as described in Example 2, except that the film is made with a core layer containing 90 wt. % EMCM and 10 wt. % cobalt masterbatch which contains 1 wt. % cobalt as cobalt octoate and no photoinitiator. The cobalt masterbatch is heat treated at 150–200° C. before it is used for making the film.

Example 7

A PET/OSP/PET multilayer structure is made essentially as described in Example 2, except that the film is made with a core layer containing 90 wt. % EMCM and 10 wt. % cobalt masterbatch which contains 1 wt. % cobalt as cobalt stearate and no photoinitiator. The cobalt masterbatch is heat treated at 150–200° C. before it is used for making the film.

Example 8

A PET/OSP/PET multilayer structure is made essentially as described in Example 2, except that the film is made with a core layer containing 90 wt % EMCM and 10 wt % cobalt masterbatch which contains 1 wt % cobalt as cobalt stearate, and no photoinitiator. The cobalt masterbatch is used as is without any heat or other treatment.

Example 9

A PET/OSP/PET multilayer structure is made essentially as described in Example 2, except that the film is made with a core layer containing 45 wt. % of EVOH, 45 wt. % EMCM and 5 wt. % cobalt masterbatch which contains 1 wt. % cobalt as cobalt oleate and 1 wt. % of Irgacure 819.

Example 10

A PET/OSP/PET multilayer structure is made essentially as described in Example 2, except that the film is made with a core layer containing 45 wt. % of EVOH, 45 wt. % EMCM and 5 wt. % cobalt masterbatch which contains 1 wt. % cobalt as cobalt oleate and no photoinitiator. The cobalt masterbatch is heat treated at 150–200° C. before it is used for making the film.

Also included within these examples and the scope of the invention are compositions comprising various combinations of these substances and materials.

Aspects of the present invention have been described by way of example only and it should be appreciated that modifications and additions may be made thereto without departing from the scope thereof.

What is claimed:

1. A multi-layer rigid container for food or beverage packaging comprising at least an inner layer, an outer layer and a core layer between the inner layer and the outer layer, wherein the inner and outer layers are comprised of an aromatic polyester or copolyester, and wherein the core layer is comprised of (i) an oxygen scavenging polymer comprising a polymer backbone and cyclic olefinic pendent groups covalently linked to the polymer backbone; and (ii) a transition metal catalyst, and wherein the oxygen transmission rate of the container is less than about 1.0 cc $O_2$ per square meter per day at atmospheric pressure and 25° C.

2. The rigid container of claim 1, wherein the inner layer and the outer layer comprise aromatic polyesters or copolyesters selected from the group consisting of polyethylene terephthalate, polyethylene naphthalate, polypropylene terephthalate, polybutylene terephthalate, polyethylene isophthalate, polycyclohexanedimethanol terephthalate, polybutylene naphthalate and polycyclohexanedimethanol naphthalate, and copolymers and blends thereof.

3. The rigid container of claim 1, wherein the cyclic olefinic pendent groups have the structure (II):

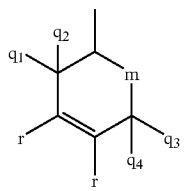

(II)

where $q_1$, $q_2$, $q_3$, $q_4$, and r are selected from the group consisting of —H, —$CH_3$, and —$C_2H_5$; and where m is —$(CH_2)_n$— with n being an integer in the range from 0 to 4; and wherein, when r is —H, at least one of $q_1$, $q_2$, $q_3$ and $q_4$ is —H.

4. The rigid container of claim 1, wherein the cyclic olefinic pendent group is selected from the group consisting of cyclohexene-4-methylene radical, 1-methyl cyclohexene-4-methylene radical, 2-methyl cyclohexene-4-methylene radical, 5-methyl cyclohexene-4-methylene radical, 1,2-dimethyl cyclohexene-4-methylene radical, 1,5-dimethyl cyclohexene-4-methylene radical, 2,5-dimethyl cyclohexene-4-methylene radical, 1,2,5-trimethyl cyclohexene-4-methylene radical, cyclohexene-4-ethylene radical, 1-methyl cyclohexene-4-ethylene radical, 2-methyl cyclohexene-4-ethylene radical, 5-methyl cyclohexene-4-ethylene radical, 1,2-dimethyl cyclohexene-4-ethylene radical, 1,5-dimethyl cyclohexene-4-ethylene radical, 2,5-dimethyl cyclohexene-4-ethylene radical, cyclohexene-4-propylene radical, 1-methyl cyclohexene-4-propylene radical, 2-methyl cyclohexene-4-propylene radical, 5-methyl cyclohexene-4-propylene radical, 1,2-dimethyl cyclohexene-4-propylene radical, 1,5-dimethyl cyclohexene-4-propylene radical, 2,5-dimethyl cyclohexene-4-propylene radical, and 1,2,5-trimethyl cyclohexene-4-propylene radical.

5. The rigid container of claim 1, wherein the oxygen scavenging polymer is selected from the group consisting of a ethylene/methyl acrylate/cyclohexenyl methyl acrylate terpolymer, a cyclohexenyl methyl acrylate/ethylene copolymer, a cyclohexenyl methyl methacrylate/styrene copolymer, a cyclohexenyl methyl acrylate homopolymer and a methyl acrylate/cyclohexenyl methyl acrylate copolymer.

6. The rigid container of claim 1, wherein the outer layer comprises polyethylene terephthalate, polyethylene naphthalate, or a mixture of polyethylene terephthalate and polyethylene naphthalate.

7. The rigid container of claim 1, wherein the composition further comprises a first tie layer between the core layer and the inner layer, and a second tie layer between the core layer and the outer layer.

8. The rigid container of claim 1, wherein the polymer backbone is ethylenic and the cyclic olefinic pendant groups are linked to the polymer backbone by linking groups selected from the group consisting of:

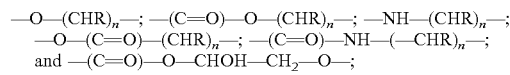

wherein R is hydrogen or an alkyl group selected from the group consisting of methyl, ethyl, propyl and butyl groups and where n is an integer in the range from 1 to 12.

9. The rigid container of claim 8, wherein the polymeric backbone, linking groups and cyclic olefinic pendent groups comprise repeating units, each unit having a structure (III) as follows:

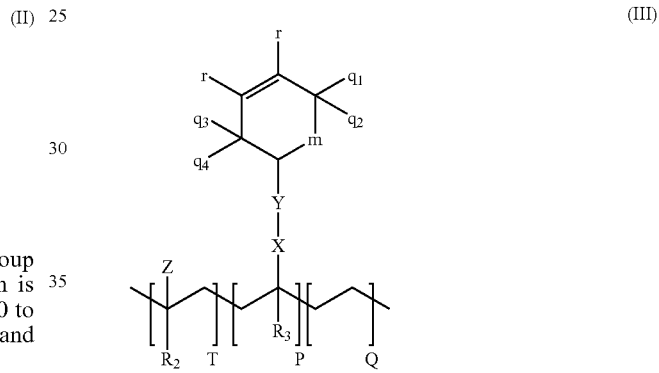

(III)

wherein P+T+Q is 100 mol % of the total composition; P is greater than 0 mol % of the total composition; Z is selected from the group consisting of an aryl group; —(C=O)$OR_1$; —O(C=O)$R_1$; and an alkyl aryl group, structure (IV):

(IV)

where $R_4$ is selected from the group consisting of —$CH_3$, —$C_2H_5$, and —H; $R_1$ is selected from the group consisting of —H, —$CH_3$, —$C_2H_5$, —$C_3H_7$ and —$C_4H_9$; $R_2$ and $R_3$ are selected from the group consisting of —H and —$CH_3$; X is selected from the group consisting of —O—, —NH—, —(C=O)O—, —(C=O)NH—, —(C=O)S—, —O(C=O)— and —$(CHR)_\lambda$—; $\lambda$ is an integer in the range from 1 to 6; Y is —$(CHR)_n$—, where n is an integer in the range from 0 to 12, R being selected from the group consisting of —H, —$CH_3$ and —$C_2H_5$; where $q_1$, $q_2$, $q_3$, $q_4$, and r are selected from the group consisting of —H, —$CH_3$, and —$C_2H_5$; and where m is —$(CH_2)_n$— and where n is an integer in the range from 0 to 4; and wherein when r is —H, at least one of $q_1$, $q_2$, $q_3$ and $q_4$ is —H.

10. The rigid container of claim 1, wherein the transition metal catalyst is a metal salt.

11. The rigid container of claim 10, wherein the metal in the metal salt is cobalt.

12. The rigid container of claim 11, wherein the metal salt is selected from the group consisting of cobalt neodecanoate, cobalt 2-ethylhexanoate, cobalt oleate, and cobalt stearate.

13. The rigid container of claim 1, wherein the oxygen scavenging composition further comprises at least one triggering material to enhance initiation of oxygen scavenging.

14. The rigid container of claim 13, wherein the triggering material is a photoinitiator.

15. The rigid container of claim 14, wherein the photoinitiator has an ultraviolet absorption window above 320 nm.

16. The rigid container of claim 1, wherein the rigid container is suitable for packaging oxygen sensitive drinks for extended freshness and shelf life.

17. The rigid container of claim 16, wherein the oxygen sensitive drink is beer, wine, or fruit juice.

* * * * *